United States Patent [19]

Stokes et al.

[11] Patent Number: 4,701,858
[45] Date of Patent: Oct. 20, 1987

[54] NONVOLATILE REALTIME CLOCK CALENDAR MODULE

[75] Inventors: John H. Stokes; John I. Clark; James D. Morris; Steven M. Ward, all of Las Cruces, N. Mex.

[73] Assignee: Energy Optics Inc., Las Cruces, N. Mex.

[21] Appl. No.: 688,035

[22] Filed: Dec. 31, 1984

[51] Int. Cl.$^4$ .................. G08B 23/00; G11C 8/00
[52] U.S. Cl. .................. 364/483; 340/870.02; 365/229; 371/66
[58] Field of Search .................. 364/184, 187, 483; 365/226, 228, 229; 371/29, 66; 340/870.02

[56] References Cited

U.S. PATENT DOCUMENTS

| | | | |
|---|---|---|---|
| 3,562,555 | 2/1971 | Ahrons | 307/238 |
| 3,820,073 | 6/1974 | Vercellotti et al. | 340/151 |
| 4,213,119 | 7/1980 | Ward et al. | 340/151 |
| 4,247,913 | 1/1981 | Hiniker et al. | 365/228 |
| 4,337,524 | 6/1982 | Parkinson | 365/229 |
| 4,412,284 | 10/1983 | Kerforne et al. | 364/200 |
| 4,431,134 | 2/1984 | Hendricks et al. | 236/46 R |
| 4,449,205 | 5/1984 | Hoffman | 365/182 |
| 4,466,074 | 8/1984 | Jindrick et al. | 364/184 |

OTHER PUBLICATIONS

"1-Farad Capacitors for CMOS Memory Backup", *Electronic Product Design*, Aug. 1982, p. 9.

*Primary Examiner*—Errol A. Krass
*Assistant Examiner*—Daniel W. Juffernbruch

[57] ABSTRACT

A circuit module for general use in microcomputer based systems, such as time-of-use electronic utility meters, which maintains realtime clock calendar information even through long term power outages of 12 hours or more without the use of batteries. Realtime computations are protected by combining a very low power realtime clock calendar integrated circuit with a large capacitor as a secondary power source. The circuit module provides a reference clock calendar for the associated microcomputer. The module includes a capacitor charging circuit deriving power from a primary power source, a crystal oscillator time base circuit and a memory read/write protect circuit. During a power failure the capacitor, which is disconnected from the primary power source, supplies to the module the necessary power to maintain valid realtime computations. At the end of the outage when line power returns, the capacitor is quickly recharged and the non-degraded realtime clock calendar database is available to be transferred to the associated microcomputer to re-establish realtime processing.

9 Claims, 4 Drawing Figures

NONVOLATILE REALTIME CLOCK CALENDAR MODULE

FIELD OF INVENTION

The present invention relates generally to an electronic module for use with an electronic time-of-use utility meter which must maintain realtime clock calendar information. In particular, the present invention computes realtime clock calendar information and maintains the computation function throughout the duration of long term power outages without the necessity for a backup battery power source.

DESCRIPTION OF PRIOR ART

In recent history, the development of the single chip microcomputer and microprocessor technology has revolutionized the design of computers, electronic games, instrumentation and a wide range of commercial products. The vast majority of these systems are powered by means of conventional AC power lines. A large number of microcomputer based systems compute and maintain realtime clock calendar (RTCC) information either as a primary or secondary function. Prevelant examples are microcomputer based digital clocks, digital thermostats, microwave ovens and video cassette recorders. A more important example is the electronic time-of-use utility meter which associates electrical energy consumption with time-of-day, day-of-week and holiday calendar dates. The realtime clock in a time-of-use meter must maintain accurate time data through long term power outages. Further the clock cannot be manually reset without costly site visitation by trained personnel equipped with sophisticated systems. The growing reliance on microcomputers to compute, monitor or display realtime is resulting in an increasing dependence on batteries to backup realtime computation.

For the past thirty years batteries have been the weakest link in electronic system design. Although improvements in battery technology have been realized, the chemical nature of batteries in general leads to significant design problems including corrosion, leakage, temperature limitations, poor reliability and short life.

The electric utility industry has a growing need for electronic time-of-use metering equipment for industrial, commercial and residential applications. However, power outages and the associated loss of realtime computation has made cost effective time-of-use metering difficult to achieve. The primary limitation has been an appropriate secondary power source. In an electronic time-of-use meter (see U.S. Pat. No. 4,213,119) where realtime computation must be maintained during outages, lithium batteries are typically used as a secondary power source. Such batteries are very expensive, have a high failure rate and must be replaced every five years. Battery replacement in potentially millions of meters represents a very serious recurring cost.

Designers of consumer products which compute RTCC information generally avoid the battery problem by simply allowing time to be lost after power outages. This approach leads to a less serious but none-the-less growing circumstance. In a common household equipped with several digital clocks, a microwave oven, a video cassette recorder, a digital thermostat and other microcomputer base products, each power outage requires the occupant to individually reprogram each appliance.

Over the last several years, the problem of digital data loss in power outages has undergone a broad attack by numerous inventors. A wide array of digital nonvolatile memory devices have been developed under common nomenclature of Read Only Memory (ROM), Erasable ROM (EROM), Erasable Programmable (EPROM), Electrically Erasable Programmable (EEPROM), Metal-Nitride-Oxide Semiconductors (MNOS) (see U.S. Pat. No. 3,820,073) and a nonvolatile Dynamic Random Access Memory (see U.S. Pat. No. 4,449,205). A number of other inventors have taken the approach of using a capacitor, charged by means of primary line power, to act as a secondary power source for low power static Random Access Memories (RAM) during outages. For example, U.S. Pat. No. 3,562,555 and U.S. Pat. No. 4,247,913 disclose the use of a charged capacitor to backup a RAM and a digital shift register, respectively, during short lived power outages. Another invention, U.S. Pat. No. 4,412,284, uses a large capacitor as a secondary supply for a digital memory. Further, on return of primary power the circuitry compares the residual capacitor voltage to a fixed threshold to determine if the outage was greater than a certain critical period of time to indicate the necessity for reprogramming. Although the prior art of storing digital data through power outages is well established, such technology is inadequate for solving the more difficult problem of maintaing RTCC computations over long term outages without the use of batteries under practical cost constraints and physical size limitations. The term "long term outages" as used herein generally means power outages exceeding 12 hours in duration. The actual range may be up to 72 hours without significant degradation, depending upon ambient conditions.

Maintaining RTCC computation through such long term outages has in recent history been impractical, because RTCC microcomputers consume substantially more power than static RAM. Although any digital circuit can be sustained by a large capacitor for short periods of time (i.e. 100 milliseconds to a few minutes), maintaining microcomputer operation for periods exceeding 12 hours has not been considered possible. As evidence of this problem, U.S. Pat. No. 4,431,134 discloses art wherein, upon a power outage, a large capacitor supplies microcomputer RTCC computation for approximately 10 minutes and then automatically disconnects the processor from the supply to avoid continued secondary power consumption. The associated RAM memory is then sustained for a period of several hours without data loss. Disclosed circuitry senses the minimum microcomputer operating voltage of 4.5 volts, and disconnects it from the supply destroying the RTCC computation, before the stored database can be degraded.

Two recent developments in capacitor technology and low power microcomputers point toward the possibility of sustaining RTCC computation during outages without the use of batteries. Low power Complementary Metal Oxide Silicon (CMOS) microcomputers are now available which require two orders of magnitude less power than their predecessors. Another significant development is the Electric Double Layer capacitor commonly called "super capacitor" which is manufactured by NEC Electronics U.S.A., Inc. and Panasonic, Inc. The operating principle is based on an electric double layer appearing at the interface between activated carbon particles and sulfuric acid solution as electrolyte. The two electrodes are separated by an ionically conducting but electrically insulating porous membrane. Conductive rubber membranes contain the electrode and electrolyte material and make contact to the cell. Several cells are stacked in series to achieve five volt working voltages. The significance of this technology is that at a reasonable cost, one farad of capacitance can be packaged in one cubic inch, a two order of magnitude reduction in volume over prior technology.

These two developments point toward the potential use of a fully charged Double Layer Capacitor (DLC) to sustain the operation of a CMOS RTCC processor during outages, so that real-time computation will continue. However, even this combination can be shown inadequate for protecting against long term outages. If one assumes that all the energy stored in a 1.0 farad DLC can be used to supply a CMOS microcomputer which requires 0.005 watts for operation, then the maximum outage duration can be calculated to be 2500 seconds or 42 minutes. With this approach a large number of DLCs would be required to protect against long term outages moving both physical size and cost beyond practical limits for most products. Even with such advanced technology, there remains a need for improved techniques to maintain RTCC computation in long term outages.

SUMMARY OF THE INVENTION

The present invention combines a very low power CMOS integrated circuit dedicated to RTCC computation with a DLC capacitor as a secondary power supply. Although the DLC devices have previously been considered inadequate for time-of-use metering due to their high leakage (self discharge) at relatively high ambient temperatures (i.e. 70° C.), the present invention is based on the discovery that both the leakage and the RTCC circuit supply requirement drop off drastically over the operating voltage range from 5 volts to 2 volts as the capacitor discharges. The present inventors found that the reduction in supply current is of sufficient magnitude to enable a low power CMOS RTCC circuit to continue operation for an unexpectedly long period of time even at ambient temperatures of +70° C.

The present invention entails a nonvolatile RTCC module which is plug-in compatible with a large number of microcomputers of the type used in time-of-use metering. The module, which computes realtime clock calendar information, is primarily powered by a DC supply derived from the associated time-of-use meter. However, on occurrence of a powerline failure, the present invention continues to compute and maintain RTCC data without degradation for periods up to and exceeding 12 hours without the use of a backup battery.

The apparatus of the present invention includes a very low power RTCC dedicated integrated circuit, a batteryless rechargeable DLC secondary supply, charging circuitry, a crystal oscillator and microprocessor interface circuitry. The apparatus is packaged in modular form allowing for convenient insertion into common microcomputer circuit boards.

When properly coupled to a time-of-use meter microcomputer circuit, the nonvolatile RTCC module of the present invention accepts initialization data from the associated microcomputer so that the realtime clock can be set to actual time. Once set, the module accurately computes RTCC data (second, minute, hour, day, month and year) which can be read by the associated microcomputer at any convenient time. In the event of a power line failure, the charging circuitry effectively disconnects the DC supply line, so that the RTCC module will continue to operate by means of its own internal secondary supply for periods up to and exceeding 12 hours. When primary power returns, the DLC secondary supply is quickly recharged and the module is again supplied by the primary DC supply line. After the outage, the non-degraded RTCC database is available to be read by the associated microcomputer to re-establish the time-of-use meter realtime processing function.

It is therefore, the primary object of the present invention to provide a batteryless nonvolatile realtime clock calendar electronic module, which overcomes the disadvantages, shortcomings and difficulties of prior art systems and which is significantly cost advantageous.

It is a more specific object of the present invention to provide a nonvolatile electronic clock used in conjunction with a time-of-use meter microcomputer which maintains valid realtime computations necessary for time-of-use metering during long term outages up to and exceeding 12 hours.

It is a still further object of the present invention to provide a nonvolatile electronic clock with an internal secondary power supply with an operating life essentially equivalent to the operating life of the other electronic components in the clock.

It is a still further object of the present invention to provide a nonvolatile electronic clock wherein the internal secondary power supply can be quickly recharged in a matter of seconds when primary power returns after an outage.

It is a still further object of the invention to provide a nonvolatile electronic clock with standard interface circuitry and packaging allowing plug-in compatability with a number of different microcomputers, wherein a properly connected microcomputer can write realtime data to the clock and read realtime data from it.

For a better understanding of the present invention, together with other and further objects thereof, reference is had to the following description taken in connection with the accompanying drawings, and its scope will be pointed out in the appending claims.

DETAILED DESCRIPTION OF THE INVENTION

Figure 1:
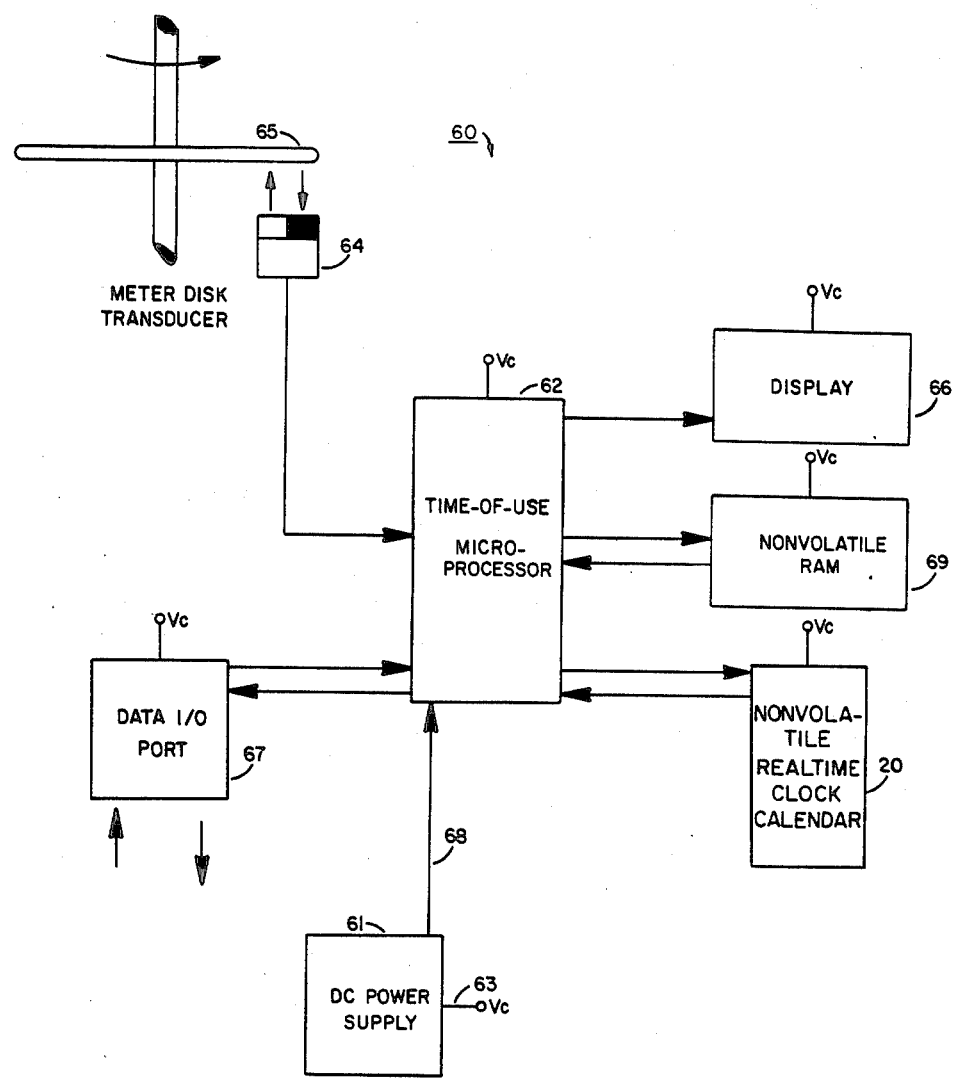
FIG. 1 is a block diagram of an electronic time-of-use meter.

A block diagram of an electronic time-of-use meter 60 is shown in FIG. 1. The system derives primary power from a DC power supply 61 which converts the AC line current available in the electric meter (not shown) to the DC power 63 required by the system electronics. The heart of the system 60 is a single chip microcomputer 62 with onboard ROM (not shown) for firmware storage and onboard RAM (not shown) for temporary data storage. In the execution of its firmware, the microcomputer 62 performs the following time-of-use metering functions:

Meter Data Collection

Realtime Data Computation
Data Processing
Meter Data Display
Data I/O Communication
Power Supply Status Monitoring.

Meter data is generated by a meter disk transducer 64 which converts the movement of the electric meter eddy disk 65 to electronic pulses (not shown) which are input to the microcomputer 62. Microcomputer 62 accumulates pulse counts as a measure of electrical energy consumption. A realtime database is maintained in the nonvolatile RTCC module 20 of the present invention which is periodically read and updated by the microcomputer 62. The microcomputer 62 combines the realtime data and the meter data to formulate a time-of-use database which includes total energy consumption, time tagged peak demand, and time categorized energy consumption totals. The processed, time-of-use meter database (not shown) is cyclically written to a display 66, so that it can be visually read and recorded by a meter reader. A bidirectional data I/O port 67 allows the microcomputer 62 to be initialized, programmed or read by means of portable equipment (not shown) carried by a skilled time-of-use meter technician.

The microcomputer 62 periodically tests the status of the DC power supply 61 by means of sense line 68 in order to determine if the AC line power is failing. When an imminent power failure is sensed, the computer 62 executes an orderly shutdown procedure transferring all meter data to nonvolatile RAM 69 (common in prior art) and all realtime data to the nonvolatile RTCC 20 of the present invention. During a power outage, the nonvolatile RAM 69 maintains the meter database without power, and the nonvolatile RTCC 20 maintains valid realtime computation by means of its own internal, secondary power supply (not shown) for a period of at least 12 hours. When AC line power returns, the microcomputer 62 resets and executes an orderly power up routine reading the database from the nonvolatile RAM 69 and the nonvolatile RTCC 20 respectively prior to continuing its normal time-of-use meter data processing functions.

Figure 2A:
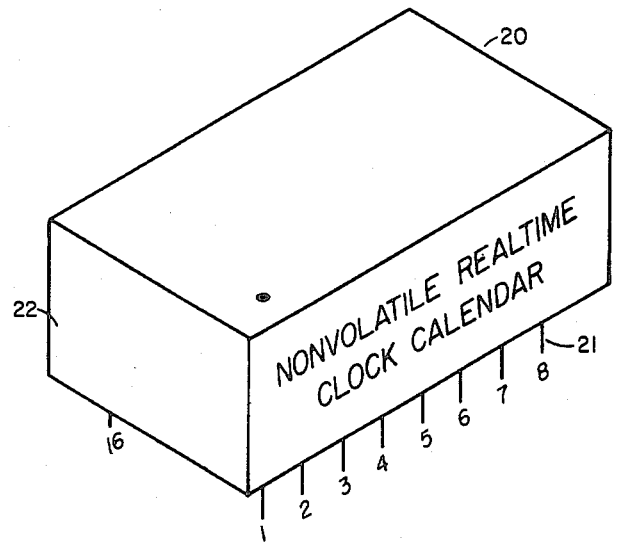
FIG. 2A is a perspective view of the Nonvolatile RTCC Module in a standard Dual Inline Package.
Figure 2B:
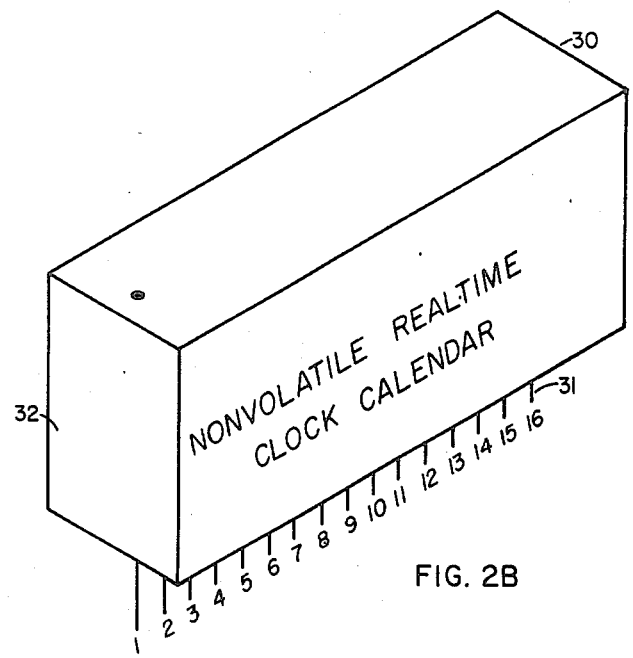
FIG. 2B is a perspective view of the Nonvolatile RTCC Module in a standard Single Inline Package.
Figure 3:
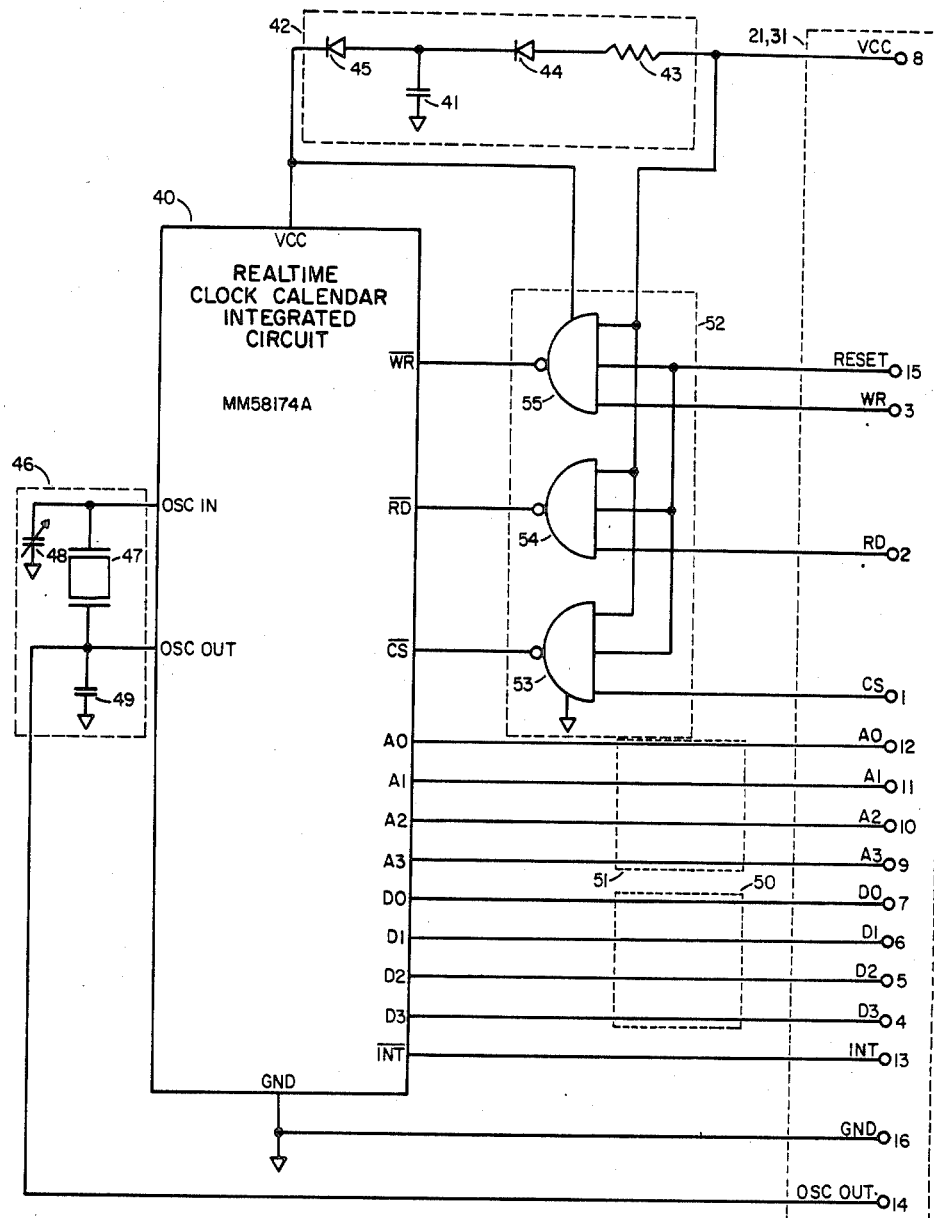
FIG. 3 is an electrical schematic diagram of the Nonvolatile RTCC Module of FIG. 2A and FIG. 2B.

Referring now to FIG. 2A, FIG. 2B and FIG. 3, the Nonvolatile RTCC Module 20, of the present invention, achieves long term outage standby operation by combining a 1.0 farad capacitor 41 for secondary power with a very low power consuming, RTCC dedicated, integrated circuit (IC) 40, for instance, an IC manufactured by National Semiconductor catalog number MM58174A. The IC 40 has CMOS logic circuits which compute realtime clock calendar information and has the following features:

Microcomputer Compatible
Realtime Computation Database
  tenths of seconds
  seconds
  tens of seconds
  minutes
  tens of minutes
  day of week
  days
  tens of days
  months
  tens of months
  year
Automatic Leap Year Calculation
Protection for Read During Data Changing
Wide Operating VoOltage Range (6.5 volts to 2.2 volts)
Low Power Standby Operation (2.2 volts at 10 uA).

The IC 40 is a low threshold metal-gate CMOS circuit that functions as a realtime clock and calendar in bus-oriented microcomputer systems where a realtime clock and calendar function is required. An on-chip oscillator maintains timekeeping down to 2.2 volts to allow low power standby operation. The time base is generated from a 32768 Hz crystal-controlled oscillator 46.

During normal operation when line power is available the capacitor 41 is charged to 5.0 volts. When a power outage occurs, a low leakage diode 44 prevents the capacitor 41 supply current from draining back into the microcomputer DC supply 61, and capacitor 41 current is supplied only to the IC 40 and NAND gate 52. The wide operating voltage range of the IC 40 allows continued operation as the capacitor 41 voltage drops due to capacitor self leakage and the IC 40 supply current drain. Approximately 83% of the energy stored in the capacitor 41 is consumed when the voltage has dropped from five to two volts.

In order to evaluate the feasibility of long term outage protection, one must consider a practical limitation in capacitor technology. At high temperature, self current leakage of a 1.0 farad double layer capacitor may be up to several hundred microamps. For example, a typical 1.0 farad capacitor 41 is specified at 350 microamps leakage at 85° C. Adding this current to the 90 microamps (at 5.0 volts) required to operate the IC 40, one estimates the supply duration by:

$$.83\ CV^2/2 = IV(t)$$

$$t = 4716\ \text{seconds}$$

$$t = 1.3\ \text{hours.}$$

By limiting the operational temperature range to 70° C. where capacitor leakage is 150 microamps, one estimates improved performance:

t=8,646 seconds
t=2.4 hours.

Based on this common technical analysis, it appears impractical to assume that the present invention will provide protection against long term outages exceeding twelve hours in duration. However, contrary to accepted theory and practice, based on experimentation conducted by the present inventors, it has been shown, that unexpectedly, both the capacitor 41 leakage and the IC 40 supply current drop off drastically as the supply voltage drops from five volts to two volts with the capacitor 41 discharge over the operational range even at high temperature. The following table illustrates this phenomena:

| @ 70° C.: | SUPERCAP VOLTAGE (V) | SUPERCAP LEAKAGE (uA) | IC DRAIN (uA) |
|---|---|---|---|
| | 5.0 | 150 | 90 |
| | 4.5 | 105 | 67 |
| | 4.0 | 50 | 45 |
| | 3.0 | 25 | 20 |
| | 2.0 | 0 | 10. |

Based on this empirical data, one would estimate performance by using the average current drain at 70° C. over the average discharge voltage of the capacitor 41, which were found experimentally to be 52 microamps and 2.96 volts.

$$.83 \ CV^2/2 = I_{avg} \ V_{avg} \ (t)$$

$$t = 67,405 \text{ seconds}$$

$$t = 18.7 \text{ hours @ } 70° \text{ C.}$$

Engineering models of the Nonvolatile RTCC Module 20, constructed and tested by the present inventors performed better than predicted, consistently demonstrating outage protection exceeding 24 hours @ 70° C. without realtime data degradation and 72 hours at room temperature where the capacitor leakage is significantly reduced.

Preferred packaging techniques for the Nonvolatile RTCC Module 20,30 are seen in FIG. 2A and FIG. 2B. The realtime clock integrated circuit 40, the capacitor 41 and associated circuitry are fabricated on a printed circuit board (not shown), connected to microcomputer 62 interface pins 21,31 and encapsulated in a potting compound 22,32. This technique results in a low cost modular construction which is very rugged and can be readily plugged into any standard microcomputer 62 printed circuit board (not shown). The preferred embodiments include a low profile Dual Inline Package (DIP) 20 shown in FIG. 2A and a high profile Single Inline Package (SIP) 30 shown in FIG. 2B. Such arrangements offer alternatives for determining the size and shape of the resultant product. Numerous other arrangements are also possible for interfacing the many different physical data bus configurations of "desk top", "personal" and other types of computers. The sixteen pin 21,31 configuration allows an associated microcomputer 62 access to all the necessary input/output lines listed below:

| PIN # | DESCRIPTION |
|---|---|
| 1 | Chip Select |
| 2 | Read Strobe |
| 3 | Write Strobe |
| 4 | Data Bit 3 |
| 5 | Data Bit 2 |
| 6 | Data Bit 1 |
| 7 | Data Bit 0 |
| 8 | "Vcc" Supply Voltage |
| 9 | Address Bit 3 |
| 10 | Address Bit 2 |
| 11 | Address Bit 1 |
| 12 | Address Bit 0 |
| 13 | Interrupt Output |
| 14 | Oscillator Output |
| 15 | Microprocessor Reset |
| 16 | Circuit Ground. |

FIG. 2 is a schematic diagram of the preferred embodiment of the present invention. The key components of the invention are the double layer capacitor secondary power supply 41 and the microcomputer bus-oriented Realtime Clock Calendar integrated circuit 40. The 1.0 farad capacitor 41 has a physical volume of 0.39 cubic inches and stores approximately 12.5 joules of energy at 5.0 volts for use as a backup power source for the IC 40 during power outages. The integrated circuit 40 includes addressable realtime counters (not shown) for tenths of seconds through months and a write only register for leap year calculation. The counters are arranged as digital bytes of four bits each. When a four bit address is imposed on the address port 51 by an external microcomputer 62 in a read operation, a four bit data byte will appear on the data I/O port 50, so that each realtime data word can be addressed independently. When an address is imposed on the address port 51 and a data word is imposed on the data I/O port 50 by an external computer 62 in a write operation, the data word is written to the appropriate realtime counter (not shown) in the IC 40. A read operation requires a strobe command on the RD line 2, and a write operation requires a strobe on the WR line 3 as is common in reading from and writing to static random access memories.

The realtime clock 40 data base and associated address bytes are identified in the table below:

| SELECTED COUNTER | ADDRESS BITS | | | | OPERATIONAL MODE |
|---|---|---|---|---|---|
| | A3 | A2 | A1 | A0 | |
| 0 - Test Only | 0 | 0 | 0 | 0 | Write Only |
| 1 - Tenths Seconds | 0 | 0 | 0 | 1 | Read Only |
| 2 - Units Seconds | 0 | 0 | 1 | 0 | Read Only |
| 3 - Tens Seconds | 0 | 0 | 1 | 1 | Read Only |
| 4 - Units Minutes | 0 | 1 | 0 | 0 | Read or Write |
| 5 - Tens Minutes | 0 | 1 | 0 | 1 | Read or Write |
| 6 - Units Hours | 0 | 1 | 1 | 0 | Read or Write |
| 7 - Tens Hours | 0 | 1 | 1 | 1 | Read or Write |
| 8 - Units Days | 1 | 0 | 0 | 0 | Read or Write |
| 9 - Tens Days | 1 | 0 | 0 | 1 | Read or Write |
| 10 - Day of Week | 1 | 0 | 1 | 0 | Read or Write |
| 11 - Units Months | 1 | 0 | 1 | 1 | Read or Write |
| 12 - Tens Months | 1 | 1 | 0 | 0 | Read or Write |
| 13 - Years | 1 | 1 | 0 | 1 | Write Only |
| 14 - Stop/Start | 1 | 1 | 1 | 0 | Write Only |
| 15 - Interrupt | 1 | 1 | 1 | 1 | Read or Write. |

When the Nonvolatile RTCC Module 20, is connected to external microcomputer 62, the microcomputer 62 can initialize or update realtime in the IC 40 by writing the appropriate data bytes (4 through 12 seen above) to the clock 40. Subsequently the microcomputer 62 can monitor the running realtime data at any convenient time by reading bytes 4 through 12 from the IC 40. The read operation is nondestructive and has no effect on the free running realtime data.

In addition to reading and writing realtime data, it is often useful for an external microcomputer 62 to receive periodic interrupts from the Nonvolatile RTCC Module 20, for accurately scheduling certain events or functions. The IC 40 provides a programmable, periodic interrupt output to the microcomputer 62 which is programmed or initialized when the microcomputer 62 writes one of the following three data bytes to address 15 (binary 1111):

| D3 | D2 | D1 | D0 | Interrupt Period |
|---|---|---|---|---|
| 0 | 1 | 0 | 0 | 60 Second Intervals |
| 0 | 0 | 1 | 0 | 5 Second Intervals |
| 0 | 0 | 0 | 1 | .5 Second Intervals. |

Referring now to FIG. 3, the Nonvolatile RTCC Module 20, includes a capacitor charging circuit 42, a crystal oscillator circuit 46 and a read/write protect circuit 52. The input power supply (Vcc) 63 Pin 8 receives 5.0 volts DC from the associated microprocessor power supply 61. A series resistor 43 limits the input capacitor 41 charging current to a maximum of 100 milliamps. At this rate, a fully discharged capacitor 41 recharges in about one minute. The charging current is passed through a low leakage diode 44 to the capacitor 41. Therefore, when the supply Voltage Vcc 63 is lost, the capacitor back biases the diode 44 which effectively opens the circuit to the power supply 61 preventing capacitor 41 current from draining into the microcomputer supply 61. Either power supply line 8 current or capacitor 41 current (during an outage) is passed to the IC 40 through a second low leakage diode 45 to reduce the supply potential for the clock circuit 40. As seen in a previous table the current supply requirement for the IC 40 drops with supply voltage. When primary power is available, the voltage drop across the two series diodes 42,43 results in a maximum voltage of about 4.1 volts supplied to the clock 40 with a corresponding maximum current drain of about 50 uA. In a power outage when the clock 40 is supplied by the capacitor 41, the voltage drops with time as the capacitor 41 discharges. The reduced voltage results in a reduced current drain by the IC 40 and a corresponding reduction in voltage drop across the diode 45. This action provides a simple technique for regulating the clock 40 supply voltage over the capacitor 41 discharge.

The crystal oscillator circuit 46 interacts with circuitry (not shown) internal to the integrated circuit 40 to provide a stable clock reference signal. The circuit 46 includes a 32768 Hz crystal 47, a fixed 20 picofarad capacitor 49 and a variable (3-36 picofarad) capacitor 48 interconnected in a common fashion allowing the crystal oscillator 46 to be manually adjusted in frequency to 32768 Hz as part of the clock module 20, manufacturing process.

The read/write protect circuit 52 is arranged to qualify read 2, write 3 and chip select 1 commands, so that degraded data cannot be accidently written to or read from the clock 40 during power up or power down transitions. The three input NAND gate 53 requires that both Vcc 8 and microcomputer RESET 15 signals be high before the IC 40 can be selected (enabled for read/write function) by a HIGH CS 1 logic command. NAND gate 54 similarly qualifies a HIGH READ command RD 2 with both RESET 15 and Vcc 8 HIGH. NAND gate 55 similarly qualifies a HIGH WRITE command WR 3 from the associated microcomputer (not shown) with both RESET 15 and Vcc 8 HIGH.

In a normal operation, when power is initially applied to the Nonvolatile RTCC Module 20, the realtime database is in a random or indeterminate state. The clock 40 must be initialized by the associated microcomputer 62 by writing valid real-time data (bytes 4 through 12) to the clock 40 by means of the address port 51 (A0 12, A1 11, A2 10, and A 3 9), the data bus 50 (D0 7, D1 6, D2 5 and D3 4) as previously described and valid WRITE commands WR 3. Once initialized, the realtime data computed by the IC 40 can be read by the associated microcomputer 62 by means of the same port 51, bus 59 and valid READ commands RD 2 at any convenient time.

When the primary power supply 61 fails, the capacitor 41 charging circuit 42 automatically disconnects the module 20, from the primary supply line Vcc 8, and the capacitor 41 serves to supply secondary power for the clock 40. The Nonvolatile RTCC Module 20 continues to operate for a period exceeding 24 hours (without primary power) even at 70° C. Since the capacitor 41 capacitance is expected to decrease to approximately 60% its initial value after 10 years (based on manufacturer test data), a minimum outage protection of 12 hours is reasonably expected over a ten year operating life.

When the primary power Vcc 8 returns at the end of the outage, the capacitor 41 simply recharges to its maximum voltage and the IC 40 continues to operate. Therefore, the associated time-of-use metering product 60 utilizing the present invention as a Nonvolatile RTCC can be completely powered down during an outage without any requirement for battery backup. When line power returns, the associated microcomputer 62 resets and reads the nonvolatile RAM 69 to reestablish the meter database and the nonvolatile RTCC module 20 to reestablish the working realtime base.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifiations as fall within the true spirit and scope of the invention.

What is claimed is:

1. A nonvolatile realtime clock calendar circuit module, including a secondary power source, for use in a microcomputer based time-of-use utility meter system deriving power from a primary power source, comprising:

semi-conductor chip integrated circuit clock. means for computation of realtime clock calendar information, including input and output means for connection to the system for transfer of data between said integrated circuit clock means and said system;

protected read/write logic circuit means connected to said integrated circuit clock means for selectively enabling said integrated circuit clock means to prevent said transfer of data when said data is undesired or degraded due to primary power source outage or transient, said protected read/write logic circuit means being responsive to qualifying digital voltage states of said primary power source and a RESET signal, before said integrated circuit clock means can be read from or written to;

time reference means connected to said integrated circuit clock means providing a precise counting reference for realtime computation;

a rechargeable capacitor connected to said integrated circuit clock means effective to provide sufficient power to said integrated circuit clock means to sustain valid realtime computation for a period exceeding twelve (12) hours when power from the primary power source of the system is not available.

2. A nonvolatile realtime clock calendar circuit module according to claim 1, wherein said rechargable capacitor means is an electric double layer capacitor with capacitance of at least 0.2 farad or more.

3. A nonvolatile realtime clock calendar circuit module according to claim 1, wherein said time reference means is a crystal oscillator.

4. A nonvolatile realtime clock calendar circuit, for use in or with an associated circuit in an electronic device having a primary power source, requiring a periodic interrupt command to provide continuity of realtime data during periods of power outages and power transients, comprising:

a semi-conductor chip intergrated circuit clock means for generating said periodic interrupt commands, including input means for receiving a digital word corresponding to a desired interrupt period and output means for transmitting said periodic interrupt commands from the calendar circuit to the associated circuit;

protected read/write means connected to said integrated circuit clock means including logic circuitry requiring qualifying digital voltage states of the primary power source and a RESET command for selectively enabling said integrated circuit clock means and preventing undesired or degraded data transfer due to primary power outages and transients;

time reference means connected to said integrated circuit clock means, providing a counting reference for generating said periodic interrupt commands;

a rechargeable capacitor adapted to be charged by the primary power supply generally at five (5) volts or greater and connected to said integrated circuit clock means, said capacitor being effective to provide a minimum of two (2) volts and a capacitance of at least 0.2 farad at 70 degrees F ambient condition to said integrated circuit clock means to sustain valid realtime computation for a period exceeding twelve (12) hours when power from the primary power source of the system is not available; and leakage prevention means between said capacitor and the power source located in one of said circuits to cause said capacitor to supply power only within said realtime clock calendar circuit during power outage and transients.

5. A nonvolatile realtime clock calendar circuit module according to claim 4, wherein said integrated circuit clock means is composed of one or more CMOS type logic chips.

6. A nonvolatile realtime clock calendar circuit module according to claim 4, wherein said integrated circuit is composed of one or more CMOS type logic chips.

7. A nonvolatile realtime clock calendar circuit module according to claim 4, wherein said time reference is a crystal oscillator.

8. A nonvolatile realtime clock calendar circuit module according to claim 4, wherein said capacitor means is controlled by a discharge/recharge diode combination providing recharge time of one minute or less.

9. A nonvolatile realtime clock calendar circuit module according to claim 4, wherein said protected read/write means comprises a CMOS circuit which is responsive only to predetermined voltage states in the associated circuit for performing the read/write function.

* * * * *